Oct. 20, 1964  J. D. WALKER  3,153,682
TANK AERATION WITH CLUSTERED FREE-FLOWING AIR ORIFICES ALONE
Filed May 27, 1955
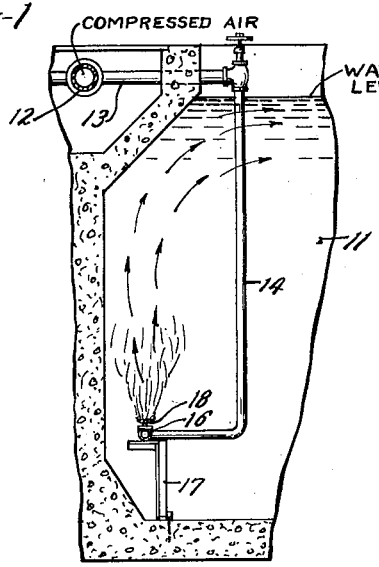
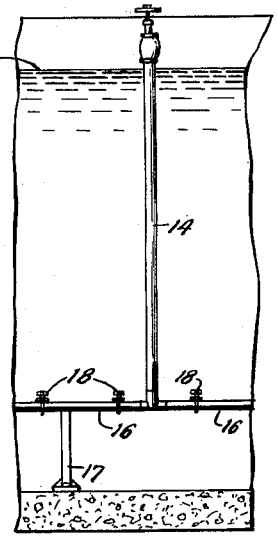
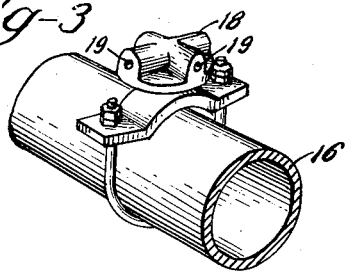
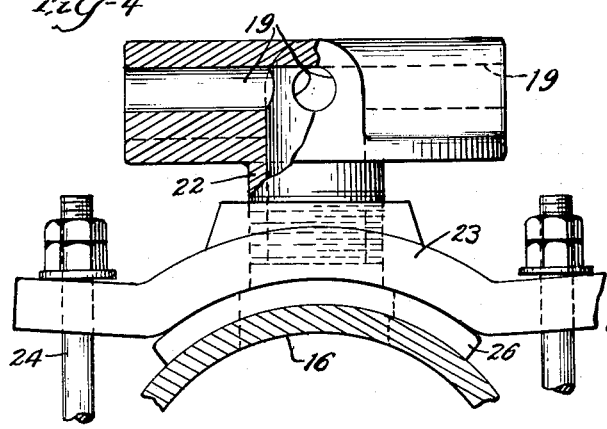
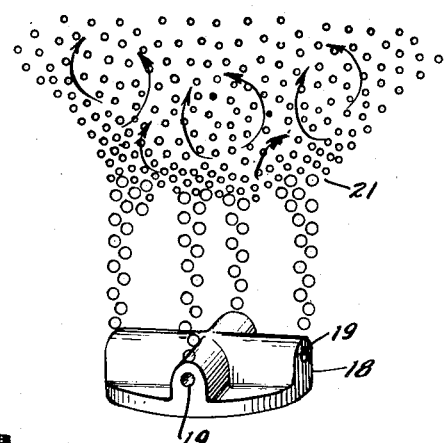
INVENTOR.
J. Donald Walker
BY
Louis Robertson, Atty.

3,153,682
TANK AERATION WITH CLUSTERED FREE-FLOWING AIR ORIFICES ALONE
James Donald Walker, Aurora, Ill., assignor to Walker Process Equipment, Inc., Aurora, Ill., a corporation of Illinois
Filed May 27, 1955, Ser. No. 511,453
16 Claims. (Cl. 261—124)

The aeration of liquids in a large tank such as those used for sewage treatment by liberating air near the bottom of the tank along a line so located as to produce a circulating roll of the contents in the tank has long been practiced. For an almost equally long time, it has been an attractive subject for study by engineers in an effort to increase efficiency and reduce trouble.

Some years ago, one of the most common types of air liberation, still used to some extent, was to force the air through porous plates, or porous pipes. This had the apparent advantage of a great multiplicity of extremely fine passages, so that air was expected to be liberated in bubbles of the smallest obtainable size. The small-sized bubbles were deemed to be most efficient because of their large ratio of contact area to volume, and because they would not simply bubble up quickly through the water without exerting a good lifting action on it. Almost from the start of the use of this type of aerator, however, it was well recognized to have drawbacks. One is in the relatively high pressure loss required for forcing the air through the pores. Another is in a pronounced tendency for the pores to gradually clog, so that more and more pressure is required for a given volume of air, and eventually the porous member may have to be discarded.

Numerous attempts have been made to provide satisfactory aeration without porous plates, and some of them have been quite successful. One of the most successful was developed by the present applicant and involves flowing a stream of water against an impingement surface and simultaneously supplying bubbles of air so that they are broken up finely by the turbulence of the water induced by the impingement. The air orifices can thus be large enough so that clogging is virtually never encountered. The water orifice can also be quite large, but since the most efficient source of the water is the tank itself, with all of its foreign bodies therein, clogging though rare, is encountered often enough to be a factor of consideration, in view of rising standards of perfection. It has been generally assumed that merely liberating the air through orifices large enough not to cause clogging trouble would produce bubbles of excessive size, so that the efficiency would be low.

According to the present invention, efficient aeration is accomplished solely by the supply of air through air orifices large enough not to clog but especially arranged to produce a functioning not previously anticipated. The orifices are provided in clusters well separated from other clusters and near the wall or boundary of the circulating roll desired. A sufficient quantity of air is liberated through them to develop the required circulating roll. As this circulation develops, a stable condition is reached, at which unexpected factors produce efficient aeration. As the air leaves the cluster of orifices, it passes upwardly for a foot or two in a rather compact stream of air bubbles which seem to have a smooth flow action which would make them quite inadequate for aeration. As they rise, however, they encounter critical conditions which rather suddenly convert the smooth-flowing stream to a different condition. Here a turbulence develops which keeps breaking up the bubbles or reforming them and spreading them apart into a much wider column. Apparently the bubbles never do reach the smallness of average size which has heretofore been considered important to efficient aeration, but the constant breaking and reforming of the slightly larger bubbles under the influence of the turbulence causes efficient aeration nevertheless.

Additional objects and advantages of the invention will be apparent from the following description and from the drawings.

Designation of Figures

FIG. 1 is a somewhat diagrammatic and fragmentary view representing a cross-section of a tank unit with the present invention embodied therein.

FIG. 2 is a view of similar character but taken longitudinally of the tank of FIG. 1 for showing particularly the spacing of the air-liberating nozzles along the header.

FIG. 3 is a perspective view showing one form of mounting of the preferred form of nozzle on the header.

FIG. 4 is a cross-sectional view taken adjacent to or partially through the middle of the nozzle of FIG. 3.

FIG. 5 is a somewhat diagrammatic view illustrating approximately the action which results from the liberation of air through the nozzle.

General Description

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The invention has been illustrated in connection with a tank 11, which may be of conventional form for treatment of sewage, industrial wastes, or other liquids needing aeration or diffusion of other gases therein. For convenience, this application will speak of aeration and sewage as representative, without repeatedly referring to the other possibilities.

In these tanks, the liquid is conventionally maintained at a liquid level near the top of the tank, as has been illustrated. Usually the tanks are quite long compared to their depth and width, and the sewage is supplied at one end and drawn off at the other, so that there is an over-all longitudinal flow.

Air is pumped through a main supply pipe 12 and branch supply pipes 13 and 14 to headers such as the one shown at 16, which may be suitably supported by standard 17. The headers 16 are located near the bottom of the tank and are provided with nozzles 18, through which they liberate air into the contents of the tank. The nozzles 18 are each provided with a cluster of orifices 19, four at present being preferred. The air liberated at each nozzle initially passes upwardly in a rather compact stream or cluster of streams, as illustrated in FIG. 5. For simplicity, FIG. 5 does not show the tilt toward the wall imparted by the rolling circulation. After they have risen a foot or two, however, a change takes place, as generally illustrated at 21, which is usually higher than illustrated. Here, the bubbles encounter relatively violent turbulence which, perhaps combined with other factors, causes them to repeatedly break up and spread about. In fact, they seem to spread through an area of a foot or so in all directions from the center of the stream. In recent months, there has been considerable testing and commercial use of the invention from which it has been determined that, even though the bubbles may not be as fine on the average as has previously been thought desirable, the aeration efficiency is high.

From the standpoint of power required, the efficiency is exceptionally high, due to the fact that it is not necessary to have either the separate stream of water or the high pressure drop of a porous plate.

Preferred Form of Nozzle

The form of nozzle at present preferred is clearly seen in FIG. 4. The orifices 19 are of short tubular type, so that they create enough back pressure to help maintain uniformity of flow through the orifices. Four orifices are preferred, partly for ease of drilling the orifices, but even more for certainty of desirable functioning. Four orifices provide fairly good distribution of air through a column of water to provide some air-lift action initially and good air-lift action after the break-up starts. The preferred diameter of the four orifice nozzles is approximately 3", that having been found to be eminently satisfactory. From 1" to 6" is believed to be acceptable. The typical orifice diameter found excellent is 5/16 inch, but from 1/8 inch to 3/8 inch is believed to be satisfactory. The diameter should be large enough so that there will virtually never be clogging and should be small enough so that the air stream will be small and sufficiently confined, so that water will have no chance of entering an orifice while the air is flowing.

In a typical, satisfactory operation, sixteen cubic feet of air per minute is liberated through one nozzle (four orifices) with an orifice velocity of 126 ft. per second and with a 7" water column head loss. It is desirable not to let the velocity fall below 70 ft. per second. It then becomes harder to keep the flow balanced through the different nozzles.

With the usual requirements as to total quantity of air, four orifices of about 5/16 inch diameter in each nozzle with the nozzles spaced from 15 inches to 24 inches along the header (or, at the outside, 12 inches to 30 inches) has been found to work very satisfactorily.

It has been found desirable to locate the nozzles closer to the wall or other boundary of circulating roll than had been the case with impingement type aerators. Twelve inches is preferred, but 6 inches to 24 inches is believed acceptable.

The nozzles may be secured to the header pipe 16 in any suitable manner. That found in FIG. 4 has been found to be economical. The nozzle 18 is provided with a stem 22 having pipe threads thereon which thread into a saddle 23. The saddle 23 is drawn, by a U-bolt 24, firmly against a saddle gasket 26, which rests on the header 16, the header being drilled so that air passes through the hole in the gasket through the hole in the saddle and through the stem 22 to the orifices 19.

The nozzles should be located at a sufficient depth below the liquid level to make sufficient use of the air-lift effect in producing a circulating roll. A submerged depth of about 8 ft. is believed to be about the minimum for efficiency, and 10 ft. or 12 ft. is preferred. The nozzles should be deep enough to cause the circulating roll to move along the bottom of the tank. As with any other type of air liberator for this purpose, excessive depths would require excessive air pressure and pumping costs. For economy, the tank may most efficiently be as wide as can be reliably caused to produce a circulating roll without excessive short-circuiting. A width of about twice the depth is believed to be nearly ideal. Up to thirty feet is fairly common, and some designers tolerate thirty-three feet. Seven feet, although practical, represents poor efficiency. With a smaller width than this, it might be questionable whether the roll would develop properly. For widths wider than thirty feet, it is preferred to locate the nozzles along one or more lines near the center, in which case there will be two rolls, one toward each side wall.

I claim:

1. A device for liberation of gas comprising a body having a fitting at its bottom and a vertical passage therein for communication with a header and having upwardly exposed horizontal crossing ribs, each of approximately three inches length, said ribs being horizontally bored, with a bore diameter of one-eighth to three-eighths inch, near the tops thereof to form orifices at the ends of the ribs with tubular passages leading to the vertical passage.

2. The method of treating waste liquid which comprises flowing it through an open retention tank, liberating bubbles in the liquid in the tank, and breaking up the bubbles and producing a roll of the contents of the tank, both solely by liberating air through a plurality of spaced orifices of one eighth to three eighths inch diameter grouped in clusters of at least four orifices, spread closely around an area of a diameter of approximately three to six inches, with the clusters spaced apart at least several times the spacing of the orifices within a cluster, with the orifices all at substantially the same level at least eight feet below the surface of the liquid and along one side of a zone free from air liberation extending from the clusters at least six feet toward a side wall, and allowing the bubbles as initially liberated to rise under the influence of their buoyancy with their condition and path altered only by the effects of bubbles similarly liberated, and thereby setting up a circulating roll of the liquid through said zone, the liberation of said air being at a velocity of at least 70 feet per second and in sufficient quantity to produce concentrated forceful air lift action above each cluster to provide more than half way down to the cluster from the surface an area of violent local turbulence which causes the bubbles to be broken up and spread around, as they rise.

3. The method of treating waste liquid which comprises flowing it through an open retention tank, liberating bubbles in the liquid in the tank by liberating air through a plurality of spaced orifices of one eighth to three eighths inch diameter grouped in clusters of at least four orifices, spread closely around an area of a diameter of approximately three to six inches, with the clusters spaced apart at least twelve inches, with the orifices all at substantially the same level at least eight feet below the surface of the liquid and along one side of a zone free from air liberation extending from the clusters at least six feet toward a side wall, and allowing the bubbles as initially liberated to rise under the influence of their buoyancy with their condition and path altered only by the effects of bubbles similarly liberated, and thereby setting up a circulating roll of the liquid through said zone, the liberation of said air being at a velocity of at least 70 feet per second and in sufficient quantity to produce concentrated forceful air lift action above each cluster to provide more than half way down to the cluster from the surface an area of violent local turbulence which causes the bubbles to be broken up and spread around, as they rise.

4. The method of treating vast quantities of watery liquid with a gas which comprises flowing the liquid through a retention tank, liberating gas bubbles in the liquid in the tank and breaking up the bubbles, solely by liberating the gas through a plurality of spaced orifices of one eighth to three eighths inch diameter each, grouped in clusters of at least four orifices spread closely around an area of a diameter of approximately 3 to 6 inches, with the clusters spaced apart at least several times the spacing of the orifices within a cluster, and allowing the bubbles as initially liberated to rise under the influence of their buoyancy with their condition and path altered only by the effects of bubbles similarly liberated; with the orifices all at substantially the same level at least eight feet below the surface of the liquid, the liberation of said gas being at a velocity of at least 70 feet per second and in sufficient quantity to produce concentrated forceful gas lift action above each cluster to provide more than half way down to the cluster from the surface an area of violent local turbulence which causes the bubbles to be broken up and spread around, as they rise.

5. Apparatus for treating a liquid with a gas comprising at least one gas header, nozzles spaced along said gas header, the distance between said nozzles being in excess of about twelve inches, said nozzles having an internal space communicating with said gas header, and gas-discharge conduits extending from said internal space and having outlets closely spaced about a central area of about three inches in diameter, the outlets of said gas-discharge conduits having a transverse dimension of from about one-eighth inch to about three-eighths inch and being spaced about said central area at points of less than about 180° apart, the outlet ends of said gas-discharge conduits being free of closely surrounding structure so that when said nozzles are positioned in a body of liquid and gas discharged from them, the gas will be introduced directly into the liquid and will rise unimpeded in the form of a gas-lift column.

6. Apparatus for treating a liquid with a gas comprising a tank having a width of not less than about seven feet, at least one gas header in said tank and positioned at least about eight feet below the top thereof, nozzles spaced along said gas header, the distances between said nozzles being in excess of about twelve inches, said nozzles having an internal space communicating with said gas header, and gas-discharge conduits extending from said internal space and having outlets spaced about and near a central area of about three inches in dimeter, the outlets of said gas-discharge conduits having a transverse dimension of from about one-eighth inch to about three-eighths inch and being spaced about said central area at points of less than 180° apart, the outlet ends of said gas-discharge conduits being free of closely-surrounding structure so that when said nozzles are positioned in a body of liquid and gas discharged from them, the gas will be introduced directly into the liquid and will rise unimpeded in the form of a gas-lift column.

7. Apparatus for treating a liquid with a gas as set forth in claim 6 in which the gas-discharge conduits are spaced about 90° apart about said central area.

8. Apparatus for treating a liquid with a gas comprising a tank having a width of not less than about seven feet, at least one gas header in said tank and positioned at least about eight feet below the top thereof, nozzles spaced along said gas header, the distance between said nozzles being in excess of about twelve inches, said nozzles having an internal space communicating with said gas header, and gas-discharge conduit means extending in different directions from said internal space and having outlet areas arranged closely spaced about a central area of about three inches in diameter, the outlet areas of said gas-discharge conduit means having a total discharge cross-sectional area substantially equal to four orifices of a diameter of from about one-eighth inch to about three-eighths inch and arranged to provide substantially equal distributed discharge, the outlet ends of said gas-discharge conduit means being free of closely surrounding structure so that when said nozzles are positioned in a body of liquid and gas discharged from them, the gas will be introduced directly into the liquid and will rise unimpeded in the form of a gas-lift column.

9. The method of producing fine bubbles in a body of liquid which comprises introducing gas substantially continuously into said body of liquid at a depth of at least about eight feet and at a plurality of positions spaced not less than about twelve inches along a generally straight line, said gas being introduced at each of said positions at a plurality of points less than 180° apart circumjacent a central area greater than about one inch and not substantially greater than six inches in dimeter, the gas as introduced into said body of liquid having a dimension in a direction transverse to its direction of flow into the liquid of at least about one-eighth inch, allowing the gas to rise freely to produce a concentrated gas-lift column within the body of liquid, the gas being introduced into said body of liquid at a velocity of at least about seventy feet per second and with a total cross-sectional stream area at least equal to about 0.05 square inch to cause the resultant rising gas-lift column to set up a state of turbulence which in turn breaks the bubbles formed in said rising column into smaller bubbles.

10. The method of claim 9 in which the central area about which the gas is introduced is about three inches in diameter.

11. The method of claim 9 in which the gas is introduced at points spaced about 90° about said central area.

12. The method of claim 9 in which the gas is introduced in streams having a diameter of from about one-eighth to three-eighths inch diameter.

13. The method of producing fine bubbles in a body of liquid which comprises introducing gas substantially continuously into said body of liquid at a depth of at least about eight feet and at a plurality of positions spaced not less than about twelve inches along a generally straight line, said gas being introduced at each of said positions in streams through nozzle-type gas liberating means at a plurality of points less than 180° apart circumjacent a central area greater than about one inch and not substantially greater than six inches in diameter, allowing the gas to rise freely to produce a concentrated gas-lift column within the body of liquid, the gas being introduced into said body of liquid at a velocity of at least about seventy feet per second and with the total cross-sectional area of said streams, as introduced into said body, being at least equal to about 0.05 square inch to cause the resultant rising gas-lift column to set up a state of turbulence which in turn breaks the bubbles formed in said rising column into smaller bubbles.

14. The method of treating waste liquid which comprising flowing the liquid through a retention zone having a width of at least seven feet, introducing air substantially continuously into the flowing liquid at a depth of at least about eight feet and at a plurality of positions spaced not less than about twelve inches along a generally straight line, the air being introduced at each of said spaced positions at a plurality of points of less than 180° apart circumjacent a central area greater than about one inch and not substantially greater than six inches in diameter, the air as introduced into said body of liquid at such points having a dimension in a direction transverse to its direction of flow into the liquid of at least about one-eighth inch, allowing the air to rise freely and unimpededly from the points of introduction into the liquid to produce a concentrated air-lift column within the body of liquid at each of said positions, the air being introduced into said body of liquid at a velocity of at least about seventy feet per second and with a total cross-sectional stream area equal to at least about 0.05 square inch to cause the air-lift column to create a state of turbulence which in turn breaks the bubbles formed in said rising column into smaller bubbles, said air further being introduced into the flowing stream of the liquid in such manner and at such positions as to produce a circulatory rolling motion of the liquid as it flows through said zone.

15. The method of claim 14 in which the central area about which the air is introduced is about three inches in diameter.

16. The method of claim 14 in which the air is introduced at points spaced about 90° about said central area.

References Cited in the file of this patent

UNITED STATES PATENTS

| | | |
|---|---|---|
| 1,214,637 | Zistel | Feb. 6, 1917 |
| 1,598,858 | Greenawalt | Sept. 7, 1926 |
| 1,861,982 | Schiller | June 7, 1932 |
| 2,144,385 | Nordell | Jan. 17, 1939 |
| 2,479,403 | Powers | Aug. 16, 1949 |
| 2,521,474 | Morgan | Sept. 5, 1950 |
| 2,532,457 | Morgan et al. | Dec. 5, 1950 |
| 2,616,676 | Walker | Nov. 4, 1952 |

OTHER REFERENCES

"The Combined Treatment of Medium and High Concentration Washes," by E. B. Mallory, in Water Works and Sewage, volume 89, No. 4, April 1942, page 146.